United States Patent [19]

Hayashi et al.

[11] 4,215,234
[45] Jul. 29, 1980

[54] NATURAL CIRCULATION TYPE EVAPORATIVE COOLING POWER CABLE LINE

[75] Inventors: Hiroaki Hayashi; Kiyoshi Fukuda, both of Tokyo; Hiroshi Kubo, Osaka; Noriyasu Yoshikawa, Osaka; Hiroshi Takada, Osaka, all of Japan

[73] Assignees: The Tokyo Electric Power Company, Tokyo; Sumitomo Electric Industries, Ltd., Osaka, both of Japan

[21] Appl. No.: 926,907

[22] Filed: Jul. 21, 1978

[51] Int. Cl.² ............................................. H01B 7/34
[52] U.S. Cl. ................................... 174/15 C; 165/105
[58] Field of Search ................. 174/15 C, 15 R, 16 R, 174/16 B, 126 S, 15 S; 165/105

[56] References Cited

U.S. PATENT DOCUMENTS

| | | | |
|---|---|---|---|
| 3,609,206 | 9/1971 | McConnell | 174/15 C |
| 3,736,364 | 5/1973 | Kubo | 174/15 C |
| 3,962,529 | 6/1976 | Kubo | 174/15 C |

Primary Examiner—Arthur T. Grimley
Attorney, Agent, or Firm—Carothers & Carothers

[57] ABSTRACT

A natural circulation type evaporative cooling electric power cable line having a circulation system for the cooling medium wherein a cooling medium passage within the electric power cable line has an inlet and an outlet respectively connected with a cooling unit positioned at a level higher than the cooling medium passages inlet of the cable by means of a feeding pipe and a return pipe with a liquefiable gas cooling medium sealed therein. At least a riser portion of the return pipe leading to the cooling unit is installed below the level of the cooling medium return passage outlet of the cable, and the return pipe is provided with a device for boosting circulation force without positive displacement mechanism (such as a pump or the like), so as to make the cooling medium circulate even in a low load current region by exceeding the current allowable without cooling for that cable.

9 Claims, 13 Drawing Figures

QUANTITY OF COOLING MEDIUM CIRCULATED

CABLE LOAD CURRENT

NATURAL CIRCULATION TYPE EVAPORATIVE COOLING POWER CABLE LINE

BACKGROUND OF THE INVENTION

1. Field of Invention

The present invention relates to an improvement in natural circulation type evaporative cooling electric power cable lines.

2. Discussion of the Prior Art

Natural circulation type evaporative cooling power cables are subjected to cooling by taking advantage of the latent heat of vaporization of a liquefiable cooling medium. Such electric power cables have a cooling medium passage therewithin and a cooling unit installed at a position which is higher than or above the cooling medium feeding inlet for the electric power cable. The cooling unit consists primarily of a condenser and a cooling medium reservoir, and strictly speaking, is installed at such a position that the surface of the cooling medium in the reservoir is located at a higher level than the cooling medium feeding inlet. The cooling unit is connected with the cable by means of a feeding pipe and return pipe for the cooling medium to construct a sealed circulation system for the cooling medium in which a suitable quantity of cooling medium is sealed. Such cooling systems make it possible to transmit large amounts of electric power as the cooling medium absorbs heat generated in the cable and vaporizes, and then circulates in the cable naturally when a large load current flows in the cable. Such a system is highly dependable because it does not require any rotary or other positive displacement mechanism for forcing circulation of the cooling medium, such as a pump. Present day cable lines such as shown in U.S. Pat. No. 3,962,529 have return piping which connects the cooling medium outlet of the cooled cable with the cooling unit in such a manner to make it easy for the vaporized cooling medium, such as sold under the trademark Freon, to rise in the return pipe to the cooling unit.

In present day systems wherein the cooling medium outlet of the cooled cable is located at a cable joint box, it is comparatively easy in theory to install the return pipe directly upward. In designing the piping for the actual installation, however, it is sometimes found desirable to position the return pipe at a position which is lower than the cooling medium outlet. Such a piping arrangement yields an even more serious problem in situations wherein the sealing end becomes the cooling medium outlet. In other words, if it is desired to install the cooling unit at a distance from the sealing end, there is a drawback in that it is considerably more difficult to install the return pipe at desired altitudes.

Furthermore, there are also situations wherein the conditions of the land make it difficult to install supporting steel structure for the return pipes and cooling unit. The present invention enlarges the scope of practical application of such cable lines by eliminating restrictive conditions for the piping of return pipes of natural circulation type evaporative cooling power cable lines. More specifically speaking, it makes such supporting steel structure unnecessary, makes it possible to freely select the location of the cooling unit to be installed, and makes it possible to bury the return pipe under the ground.

With natural circulation type evaporative cooling cable lines heretofore in use, dependable circulation was made possible by utilizing the phenomenon wherein the specific gravity of the vaporized cooling medium is smaller than the specific gravity of the cooling medium in liquid phase. However, if the return pipe is installed downward from or below the cooling medium outlet, it is then necessary to force the vaporized cooling medium to move downward. As this is against natural phenomenon, circulation will not be attained. In consequence, the construction of the piping in this manner was impracticable, and this caused a restrictive condition in designing the cable line. By analyzing interesting phenomena discovered in the course of researches, the present invention was discovered, as it was found out that 100% freedom of return piping, which was considered impossible in the past, could be insured by adding a simple mechanism.

SUMMARY OF THE INVENTION

The cooling medium circulation system of the present invention is characterized in that a riser portion of the return pipe coming from the cooling medium passage outlet of the cable and leading to the cooling unit is installed below the level of the cooling medium return passage outlet of the cable, and the return pipe is provided with means for boosting circulation force without positive displacement mechanism (such as a pump or the like) so as to make the cooling medium circulate even in a low load current region which does not exceed the current allowable without cooling for the particular cable.

This means for boosting circulation force may be further characterized in that a lower portion of the riser portion of the return pipe installed below the level of the cooling medium return outlet is constructed as a heating pipe made of high electrical resistance metal pipe and the cable is surrounded with a saturation type magnetic core in the neighborhood of the cooling medium outlet, and means is provided for heating this heating pipe by induction current induced therein by the magnetic core to cause circulation of the cooling medium.

This heating pipe can be further adapted such that the heating current is almost saturated when the load current allowable without cooling for the cable flows in the cable while the heating current does not exceed twice the aforementioned current even when the load current allowable with cooling flows in the cable. It is also preferable that the heating pipe be thermally insulated.

In a further modification, three such power cables are provided for conduction of three-phase current together with three of the aforesaid magnetic cores respectively surrounding the cables and the means for boosting circulation force of the cooling medium in the cables is characterized in that three return pipes are provided, one for each cable, and each of them includes one of the aforementioned heating pipes of high electrical resistance metal. The means for heating these heating pipes by induction current due to the load current of the cable conductor flow in the return pipes includes a conductor electrically short-circuiting the three return pipes together on their cooling unit connection side and a conductor electrically short-circuiting them together on their cooling medium outlet side after having this shortcircuiting conductor pass through the three magnetic cores surrounding the cables respectively.

In another embodiment of the present invention, which includes three cables for conduction of three-phase current, a branch pipe connects the three cooling medium passage outlets of the cables to the return pipe, and the return pipe and feeding pipe are constructed of good electrical conducting metal. The means for boosting cooling medium circulation force in this situation includes a conductor electrically short-circuiting the return pipe with the feeding pipe. This short-circuiting conductor passes through the aforesaid magnetic core which surrounds one of the cables in the neighborhood of its cooling medium outlet, and as before, the heating pipe is positioned below the cooling medium outlets of the cables.

In yet another embodiment, the means for boosting circulation force of the cooling medium within the cable is characterized in that a gas-liquid separator is provided which separates the vaporized cooling medium and the cooling medium in liquid phase. This separator is provided at a lower position of the riser portion of the return pipe rising to the cooling unit. This riser return pipe between the gas-liquid separator and the cooling unit is divided into a plurality of riser return pipes having different diameters and arranged such that the vaporized cooling medium will preferentially flow into a riser return pipe of smaller diameter as the temperature of the cable increases.

In this latter embodiment, the means for boosting circulation force may further be characterized in that a lower portion of a riser return pipe of smaller diameter is made a heating pipe of high resistance metal, and the cable is surrounded with a saturation type magnetic core in the neighborhood of the cooling medium outlet, and means is provided for heating the heating pipe by induction current which is induced therein by the aforesaid magnetic core to cause circulation of the cooling medium.

This latter-mentioned means for heating the heating pipe may further novelly include having the return pipe, including the riser return pipes of smaller diameter, and the feeding pipe being constructed of good electrical conductor metal and this return pipe and the feeding pipe are electrically short-circuited together at the cooling unit. A conductor is also passed through the aforementioned magnetic core and electrically short-circuits the return pipe to the feeding pipe and thus completes an electrical circuit for heating the heating pipe by induction current which flows in the heating pipe due to a load current of the cable.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENTS

Figure 1:
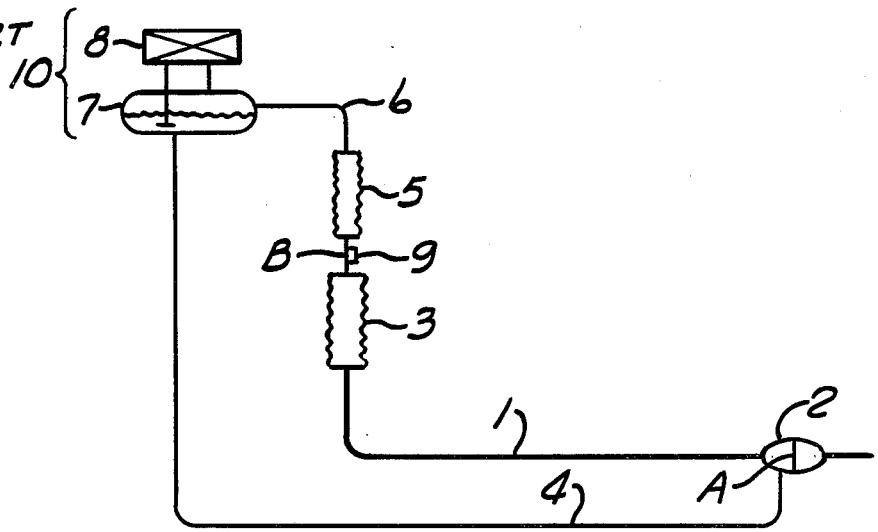
FIG. 1 is a schematic diagram of a prior art natural circulation type evaporative cooling power cable line system.

FIG. 1 shows an example of a power cable line heretofore in use. In this example, the cooled body consists of, the electric power cable 1 having a cooling medium passage therethrough (not specifically shown, see U.S. Pat. No. 3,962,529 for prior art structure details), a cable joint box 2 and a sealing end 3. The cooling unit 10 consists of a reservoir 7 and a condenser 8. The cable and the cooling unit are connected by the feeding pipe 4 and the return pipe 6 and form a cooling medium circulation system. The cooling medium is fed to the cable via an insulating connector built in the cable joint box 2. The cooling medium inlet A of the cable is therefore located in the cable joint box.

At the outlet side of this example, the insulating device 5 is positioned above the sealing end 3 and the return pipe 6 is provided in such a position as to make it easy for the vaporized cooling medium to move upward. The cooling medium outlet B of the cable in this case is provided at the electric current connection terminal 9.

Figure 2:
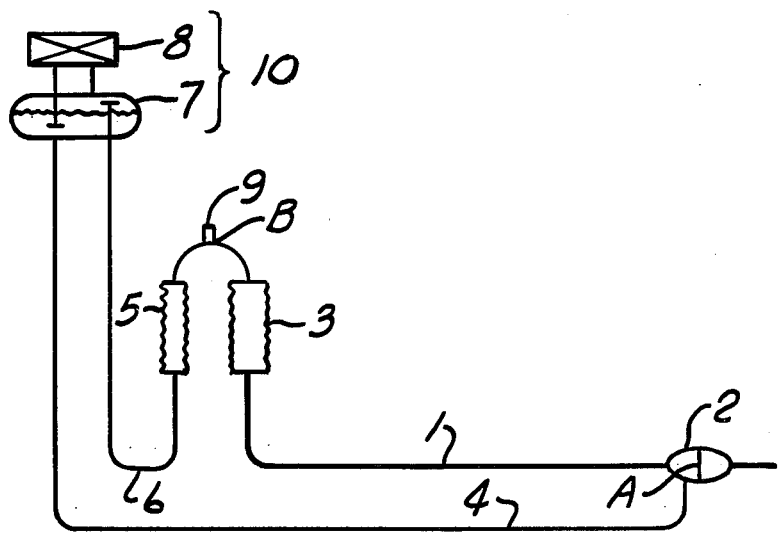
FIG. 2 is a schematic diagram illustrating a variation of the prior art system of FIG. 1 with the cooling medium return pipe illustrated at a level below the cooling medium return passage outlet of the power cable in accordance with the teachings of the present invention.

FIG. 2 is a diagram explanatory of how the return pipe is positioned when the present invention is to be applied to the example shown in FIG. 1, and it shows that the return pipe is installed downward from or below the cooling medium outlet B, which was not previously considered possible or practical. In FIG. 2, the vaporized cooling medium has to move downward in the insulating device 5 and the descending portion of the return pipe 6, and this obstructs the movement of vaporized cooling medium. This is a phenomenon which generally is also called vapor-lock.

Figure 3:
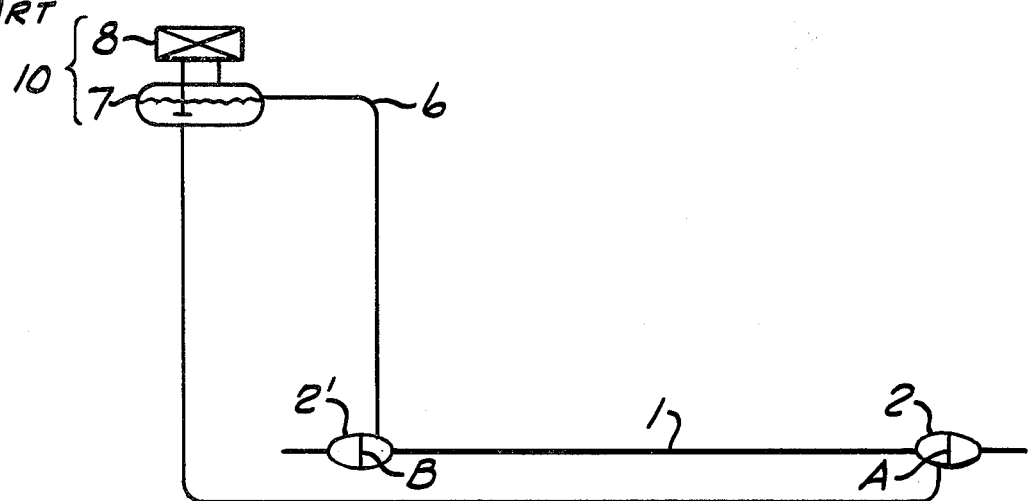
FIG. 3 is a schematic diagram illustrating a prior art natural circulation type evaporative cooling power cable line system.

FIG. 3 shows an example of a line heretofore in use, in which cable joint boxes 2 and 2' are provided at both ends of the cable 1 respectively. The same elements are designated with the same reference numerals throughout the specification. In this case, also, the return pipe 6 is positioned higher than the cooling medium outlet B so as to enable the vaporized cooling medium to easily travel to the cooling unit as an ascending stream of gas.

Figure 4:
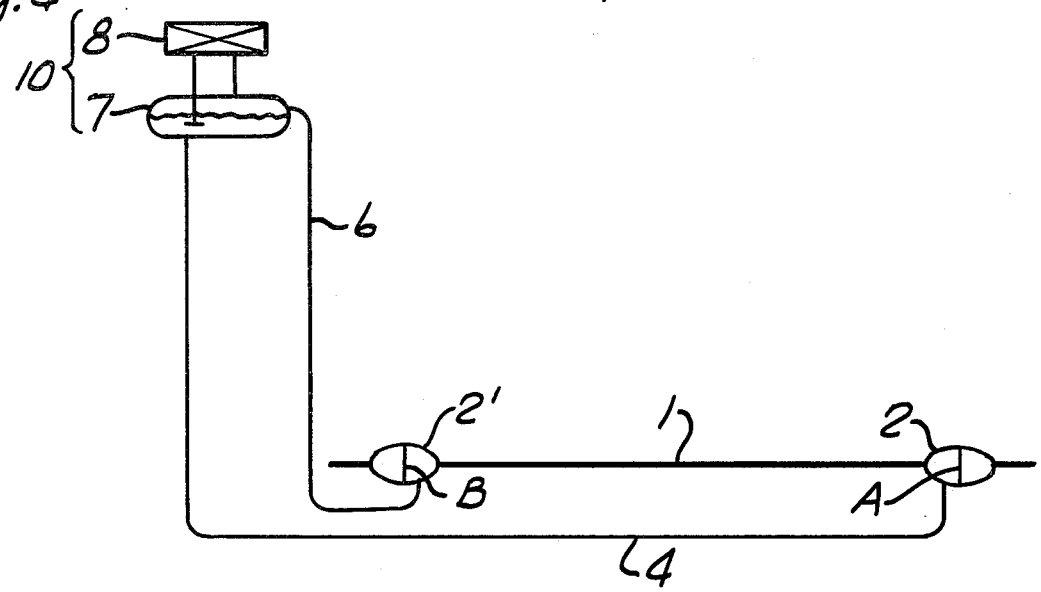
FIG. 4 is a schematic diagram illustrating the system of FIG. 3 with the return pipe positioned below the level of the cooling medium return passage outlet of the power cable in accordance with the teachings of the present invention.
Figure 8:
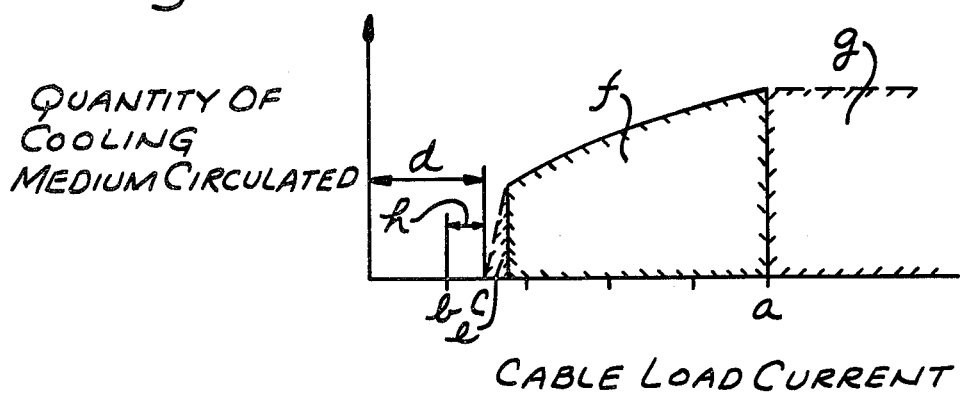
FIG. 8 is an additional graphic illustration of the quantity of cooling medium circulated in relation to the cable load current to further assist in explaining the present invention.

FIG. 4 is a diagram explanatory of how to position the return pipe in the event that the present invention is to be applied to the line shown in the example of FIG. 3. It is shown that the return pipe 6 is installed downward from or below the cooling medium outlet B.

Figure 5:
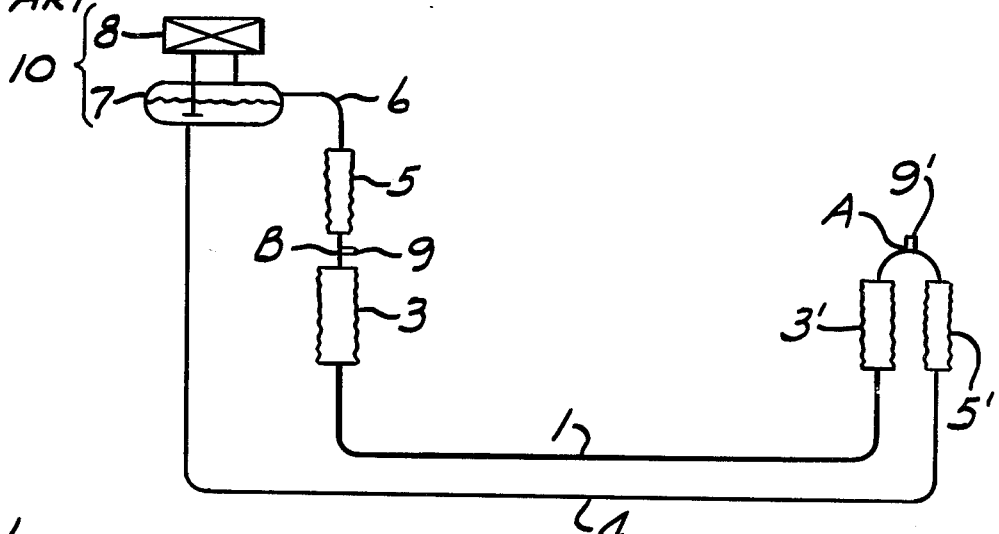
FIG. 5 is a schematic diagram of another prior art natural circulation type evaporative cooling power cable line system.

FIG. 5 shows an example of a line heretofore in use, in which sealing ends 3 and 3' are provided at both ends of the cable 1 respectively. The return pipe 6 is provided at a higher level than the cooling medium outlet B of the cable with the insulating device 5 provided in between.

Figure 6:
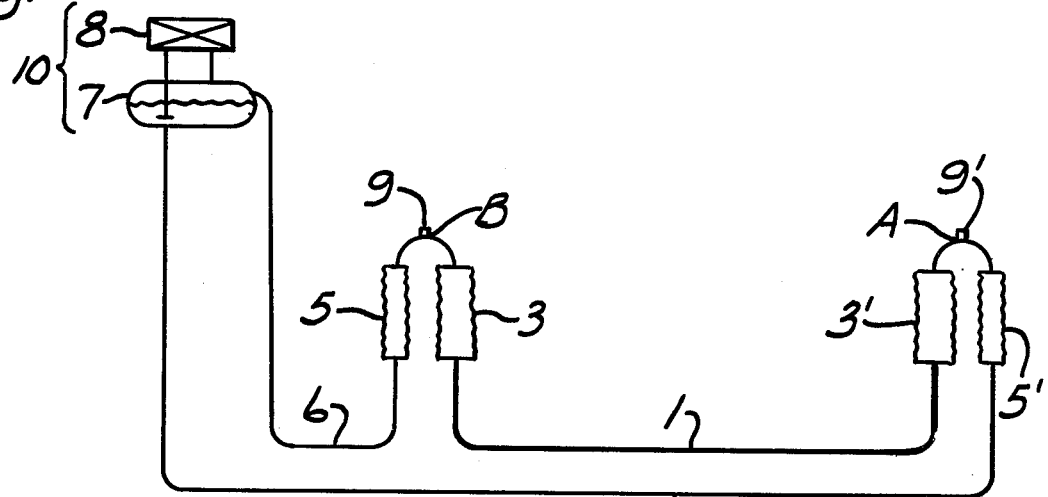
FIG. 6 is a schematic diagram illustrating the system of FIG. 5 with the cooling medium return pipe positioned below the level of the cooling medium return passage outlet of the cable in conformity with the teachings of the present invention.

FIG. 6 is a diagram explanatory of how the return pipe is positioned in the event that the present invention is to be applied to the line of the example shown in FIG. 5. It is shown that the return pipe 6 is installed downward from or lower than the cooling medium outlet B.

From research efforts of the inventors, it has been discovered that in situations wherein load current flows in the cable of the examples of the conventional lines shown in FIGS. 1, 3 and 5, natural circulation is established by the heating of the cable and no problem is encountered. It has also been ascertained that some protruding parts or irregularities existing in the route of the cable 1 also cause no trouble.

However, it has also been discovered that if the return pipe is installed lower than the cooling medium outlet as in the case of FIGS. 2, 4 and 6, the cooling medium does not circulate and cooling becomes impossible when the load current is low, although the cooling medium circulates without any trouble and provides cooling when the load current flowing in the cable is large. This phenomenon is a new problem unique to the natural circulation type evaporative cooling cables. It does not give rise to any problem in the case of forced circulation. No such problem occurs with the internal cooling cables using water or oil, either.

Figure 7:
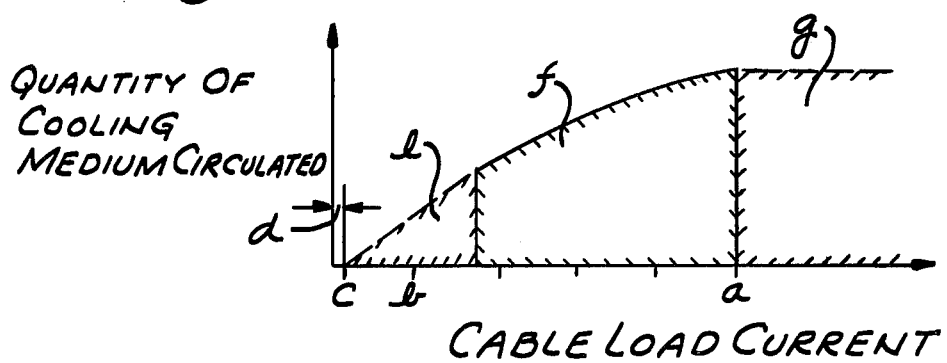
FIG. 7 is a graphic illustration of the quantity of cooling medium circulated in relation to the cable load current for assisting in explanation of the present invention.

This phenomenon will be explained with reference to the drawings. FIG. 7 is a diagram for a situation in which the allowable current with cooling a is designed to be five times the allowable current without cooling b. If the load current in the cable is increased, the cooling medium starts circulation practically immediately. However, since some excessive cooling medium flows in due to the circulation of the cooling medium, an intermittent circulation e is observed. If the electric current is further increased, it becomes a continuous circulation f and the circulating quantity of the cooling medium also increases. Then it reaches the dry-out region g where the circulating quantity of the cooling medium no longer increases even if the load current is increased and the cooling medium at the cooling medium outlet of the cable is completely in a vapor phase only (dryness degree 1). Since the cable cannot be cooled by the latent heat of evaporation when it has entered the dry-out region g, the allowable electric current for an evaporative cooling cable is that of a value just before this dry-out.

Generally speaking, heat is accumulated even if the load current in the cable is small. Since vaporization phenomenon occurs and circulation begins when heat sufficient for evaporation is accumulated, the load current to start circulation may be considered substantially zero, and no problem is encountered.

However, with the piping used with the present invention applied as shown in FIG. 2 and others, a phenomenon occurs that although no change from the past condition is observed at all in the large current region, the intermittent circulation region e becomes particularly shortened and the stationary region d becomes larger. The load current c required to start circulation becomes large. The problem is that if this load current c to start circulation becomes larger than the allowable current b without cooling of that cable, cooling inability region h is established wherein circulation does not take place notwithstanding the necessity for cooling, and when the electric current in the cable is in this region, the difficulty occurs that the cable is not cooled but becomes excessively heated.

According to the results of experimental and theoretical studies conducted by the inventors, this cooling inability region h may or may not take place, depending on various factors such as the degree of lowering of the return pipe, diameter of the return pipe, length of the cable, height of the installed position of the cooling unit above the cable, etc. It has thus been established that a new device, which will be described hereinafter, is necessary if the cooling inability phenomenon is to be absolutely prevented from occurring after taking into consideration changes in such environmental conditions as atmospheric temperature, weather, etc. In other words, it is necessary to provide a circulation force boosting mechanism on the return pipe 6 to circulate the cooling medium in the low current regions of allowable load current without cooling.

The present invention was discovered as a fruit of the aforementioned studies. It enhances the degree of freedom allowed in installing natural circulation type evaporative cooling cables and expands the locations where they can be used or installed.

Figure 9:
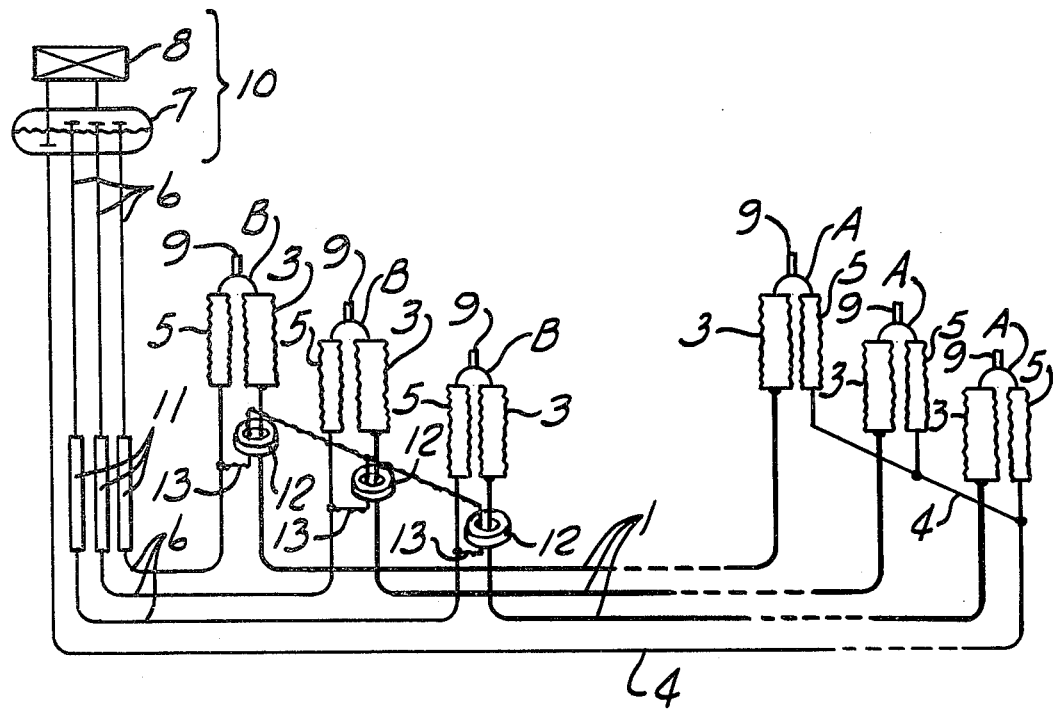
FIG. 9 is a schematic diagram illustrating one embodiment of the natural circulation type evaporative cooling power cable line system of the present invention.

FIG. 9 shows an example embodiment of the present invention applied to a three-phase A.C. power cable. The line therefor consists of three sections of cable 1. Each of the cables has its accessories such as the sealing ends 3 and others as previously described. In this example, sealing ends are positioned at both ends of the cable.

The cooling unit 10 is provided at a location which is higher than the cooling medium inlet A of the cables. A return pipe 6 is provided for each of the cables. The return pipes 6 are connected to the cooling medium outlet B of the cable via the insulation device 5, and the return pipes 6 are installed downward from or below the cooling medium outlets B. The return pipes 6 are made of a good conductor metal, such as copper or aluminum pipe, and are lightly insulated with polyvinyl chloride (PVC) or polyethylene (PE) or the like. A portion of each return pipe 6 (preferably the lowest portion, if possible, of the riser portion of the return pipe which rises to the cooling unit) is made of a stainless steel pipe which has a comparatively high electric resistance or an iron pipe which has a high A.C. resistance. This is termed the heating pipe 11.

The three return pipes 6 are connected to the reservoir 7. The reservoir 7 is a good electrical conductor, and the three return pipes are electrically short-circuited there. If the reservoir is not a good conductor, it is permissible to provide a separate short-circuiting conductor to short-circuit the three return pipes. Each of the three cables 1 is surrounded by a magnetic core 12 made of silicon steel plate or the like to compose a magnetic circuit. A conductor 13 (in the form of a wire, plate or pipe) is positioned through each of these magnetic cores 12, and the ends on one side of these conductors are electrically connected to the return pipes respectively, while the other ends of these conductors are short-circuited together to one another. Instead of having the conductors 13 run through the magnetic cores, it is also permissible to have the cooling medium pipes 6 positioned through them and the conductor 13 used merely for short-circuiting. In this instance, however, there is a drawback in that it is difficult to make more than one conductor turn through the cores.

In this example embodiment, the feeding pipe consists of a single pipe, which is branched into three pipes in the neighborhood of the cooling medium feeding inlet A, and they are led to the cables respectively. The dimensions of the magnetic core 12 are dependent upon the number of turns of the conductor 13 placed through it (usually about 1 to 3 turns), as well as the total impedance of the return pipe, total effective resistance, electric power to be heated, etc. The best efficiency will be obtained by selecting a material for conductor 13 which has a comparatively excellent magnetic saturation characteristic and making a determination such that if allowable load current without cooling flows in the cable, a predetermined electric current flows in the return pipe 6 and a condition of magnetic saturation is reached. At least when current is induced to flow in the heating pipe 11 when the allowable load current without cooling flows as the standard, it is necessary to utilize the magnetic saturation characteristic wherein the heating electric current of the heating pipe does not exceed twice the standard when allowable load current with cooling flows in cable 1. Otherwise, the amount of heat generated by the heating pipe at the time large load current flows becomes four times the minimum requisite amount or more. This is not desirable, as it calls for a larger size cooling unit which is uneconomical, and increases the loss of electric power.

As a result of the inventors' researches, it has been discovered that when a large load current flows in the cable 1 with a magnetic core designed under such conditions in use, a considerable amount of noise (magnetic distortion noise) is generated, even if a magnetic core which is not cut is used. Consequently, the magnetic core should be completely surrounded with a noise-insulating layer, and it is possible to thereby reduce the noise level. According to the results of experiments, the noise level was brought down by about 20 phon by merely providing an asbestos noise-insulating layer (thickness approximately 10 mm) and a rubber tape layer (thickness approximately 2 mm). It has also been found necessary for practical purposes to surround the entire magnetic core with some noise-insulating layer in the event the allowable load current with cooling is 3000 ampere or more.

It is in the best interest of efficiency to position heating pipe 11 as low as possible (at about the lower one-third to one-fifth portion of the total riser height) in the riser portion of the return pipe leading to the cooling unit. When the lower horizontal portion of the return pipe is inclined, it is better not to heat the pipe where the gradient is downward with reference to the direction of cooling medium flow, while it is preferable to heat it where the slope is upward. The length of the heating pipe cannot always be designed to a desired length because it is determined depending on the requisite amount of heat and the dimensions of the magnetic core, number of turns, diameter and material of the heating pipe, etc. Therefore, it is preferred to make the lower portion of the rising return pipe the heating pipe. The heating pipe is thus located at a position including the lower portion of the return pipe rising to the cooling unit.

Since the construction shown in FIG. 9 is made as mentioned above, circulation is insured because the cooling medium vaporizes at the heating pipe even in the region of a low load current, such as the allowable current without cooling, and an ascending flow of bubbles is generated in the riser portion of the return pipe and boosts the force of circulation. According to the results of experiments, when the height of the cooling unit was 8 m, cable length 50 m (inner diameter of the cooling medium passage in the cable 50 mm), inner diameter of the return pipe 50 mm, and height of the cooling pipe extending down from the cooling medium outlet was 6 m, circulation was insured with a load current of 1000 A, which is allowable without cooling even under the worst conditions, when a lower portion of the riser, one-third of the whole riser height, was heated by 5 KW.

In this example embodiment, an important point is that it is not necessary to newly install a lead wire for electric heating power supply to the return pipe, because the return pipe is made of a good conductor and a portion of it is constructed as the heating pipe by changing the material, and one end of the return pipe is short-circuited by means of the reservoir or another conductor while the other end is short-circuited by means of a conductor running through the magnetic core. The conductor running through the magnetic core is made of an aluminum bar and the return pipe is made of polyvinyl chloride (PVC) covered extruded aluminum tube. If they are jointed by welding, they are mechanically strong and can be used stably for many years. As the heating pipe is a simple tube, it is of a higher dependability than a heating apparatus using heater wire or the like and is free from the fear of wire breaking, poor contact etc.

Still more important is the fact that the heating part itself is in direct contact with the cooling medium. If the heating portion of the heating pipe is an indirect heating means, such as for example a plastic-sheathed wire wound around an aluminum pipe (such as the plastic and wire respectively sold under the trademarks Teflon and Nichrome), the efficiency of heat transmission to the cooling medium is poor, and the heat transmission characteristic is not always stable. This latter type heater is not preferable, as it has many drawbacks for practical use.

Also, the riser portion of the return pipe to the cooling unit, the heating pipe and the return pipe between the heating pipe and the cooling unit, should be thermally insulated. At the time of blizzard or heavy rain, the dissipation of heat from the return pipe becomes very great, and the electric power for heating must be increased commensurably such that it becomes impractical. Even a simple thermal insulation, for example the provision of a PVC layer of a thickness of 5 mm, makes it possible to reduce the heating electric power to one-half to one-third.

The present inventors already discovered some time ago that the provision of a heating portion in the return pipe portion had the effect of improving the initial circulation characteristic in the large load current region (Japanese Utility Model Application Laid-Open No. 6882 of 1972). However, in that case, the cooling medium return pipe was installed higher than the cooling medium outlet in accordance with the conventional method, and it was not a combination with a return riser pipe installed or starting below the outlet, as is the case with the present invention. Furthermore, the heating in that case is done before the cable is charged with load current, and a separate energy source for the heating is needed.

On the other hand, as is shown in Japanese Patent Application Laid-Open No. 109884 of 1974, a device using a magnetic core for the electromagnetic induction branching of electric power was already proposed, and this in and of itself is not now particularly a novelty. However, the concept that considers a low load current region and the yielding of magnetic saturation with load current allowable without cooling for that cable has not heretofore been revealed. The present invention has thus made it possible to install the return pipe downward or below the outlet, which has hitherto been considered impossible, by novelly combining these prior art techniques with the object of eliminating the restrictions on the installation of the natural circulation type evaporative cooling cable, thereby enlarging the scope of applications of the cable.

Figure 10:
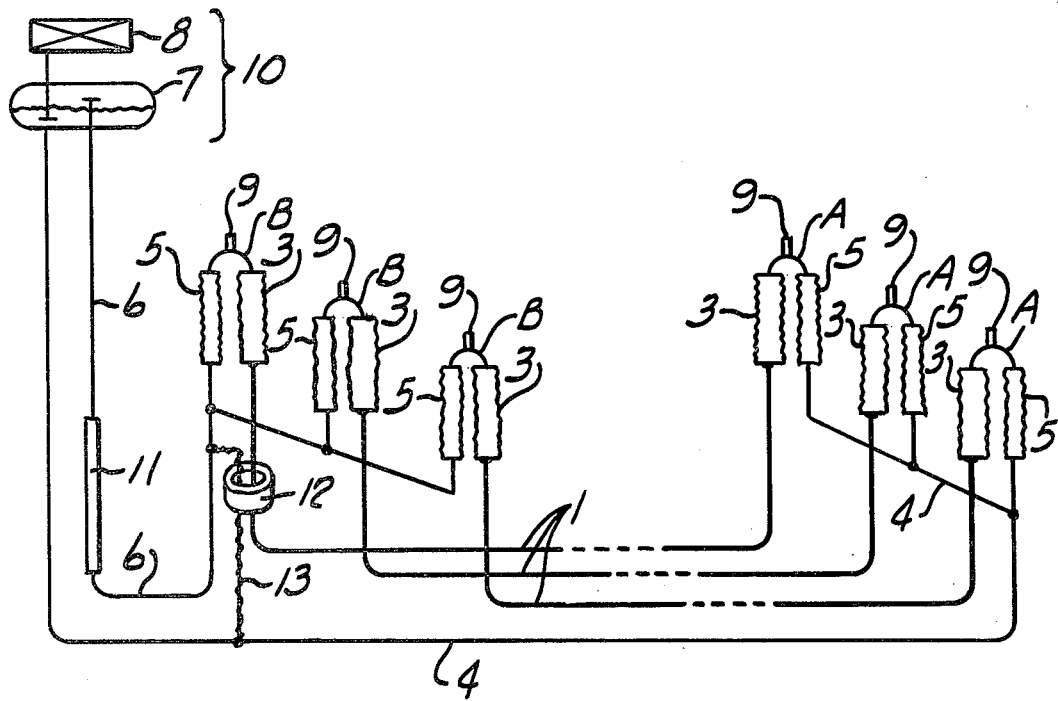
FIG. 10 is a schematic diagram illustrating another embodiment of the natural circulation type evaporative cooling power cable line system of the present invention.

FIG. 10 shows another example embodiment of the present invention. It is different from FIG. 9 in that three return pipes are not separately provided for the different phases, but there is one return pipe consolidating those three. Consequently, there is only one heating pipe, which is a part of the return pipe, and only one magnetic core. The conductor 13 may be connected to both ends of the heating pipe 11, but is given a minimum distance connection here, as in FIG. 9, by making the feeding pipe a pipe of a good conductor metal.

These are merely examples of the circulation force boosting mechanism of the present invention, but the heating pipe 11, magnetic core 12 and conductor 13 are the basic structural elements for these embodiments.

Figure 11:
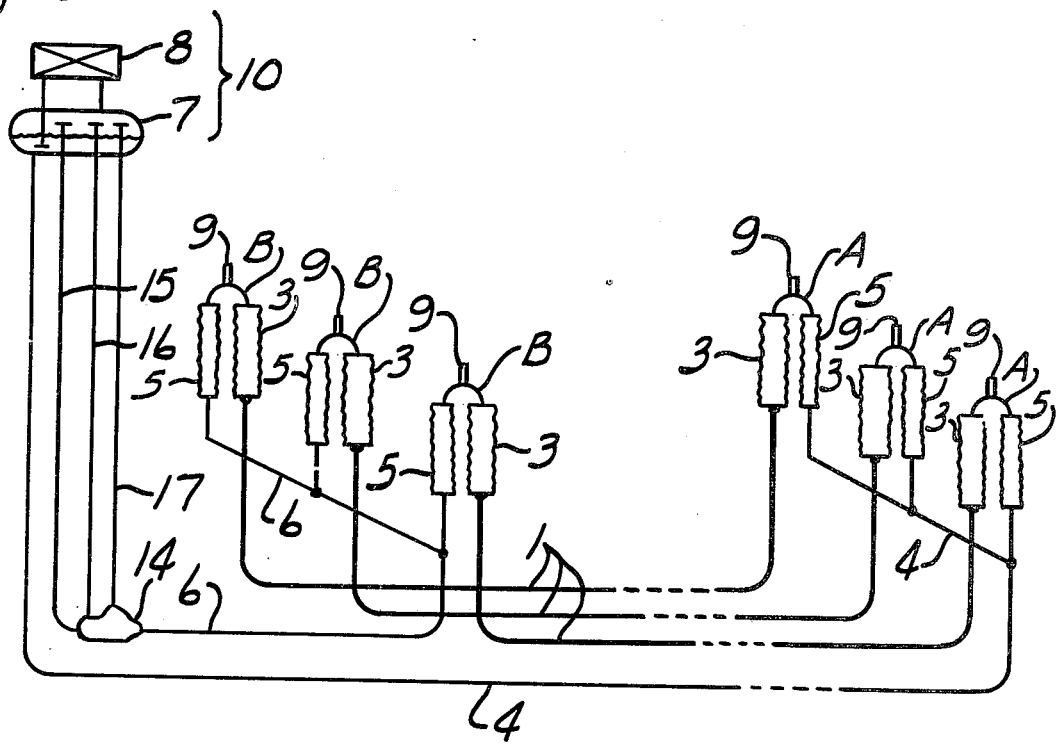
FIG. 11 is a schematic diagram illustrating yet another modification of the power cable cooling system of the present invention.

FIG. 11 shows another example embodiment of the circulation force boosting mechanism. In this example, the gas-liquid separator 14 and auxiliary return pipes 16 and 17 (referred to as the first auxiliary return pipe 16 and the second auxiliary return pipe 17, respectively) are structural elements of the circulation force boosting mechanism. In the aforementioned example embodiments in which a heating pipe was provided, the density of cooling medium in the riser portion of the return pipe was lowered, and circulation force was boosted by positively generating vaporized cooling medium in the riser portion of the return pipe. In this example embodiment, however, it is intended to produce a large circulation force with a small quantity of vaporized cooling medium by effectively utilizing a vaporized cooling medium that has been generated in the cable portion even in a small quantity. For this reason, the number of auxiliary return pipes may be one, two or more, if necessary. In this case, it is necessary to make the diameter of the auxiliary pipe smaller than that of the main return pipe, preferably one-half or less. The reason for this is that even if the quantities of vaporized cooling medium generated are the same, the volume occupied by the vaporized cooling medium in the total volume is larger in the riser pipe of a smaller diameter, so that the apparent specific gravity becomes smaller and the circulation force greater.

If a second auxiliary return pipe is to be provided, it is desirable that its diameter does not exceed one-half of the diameter of the first auxiliary return pipe. (The diameter of the first auxiliary return pipe does not exceed one-half of the diameter of the main return pipe.) If it is supposed that the load current allowable without cooling is one-fifth of the load current allowable with cooling, then the quantity of vaporized cooling medium generated at the time load current equal to the load current allowable without cooling flows will be about $(1/5)^2 = 1/25$ or less of the quantity at the time load current allowable with cooling flows. In this instance, it is necessary to make the pipe diameter one-fifth or less, if apparent densities in the riser pipes are to be made equal, and this indicates that the first, second and third auxiliary recovery pipes are necessary. Although the ratio of diameters between the main return pipe and the auxiliary return pipe or between two auxiliary return pipes is preferably not in excess of one-half, a greater friction pressure loss of the circulation of cooling medium will result and will be disadvantageous if the ratio is made to be one-quarter or less. For this reason, it may be necessary in some cases to use a plurality of auxiliary return pipes having different diameters.

The importance of this embodiment is the action of the gas-liquid separator. In FIG. 11, almost all of the vaporized cooling medium generated in the cable is led to first flow into the second auxiliary return pipe. If the diameter of this second auxiliary return pipe is made to be one-quarter of the diameter of the main return pipe, the same circulation force as that obtained when only one main return pipe is provided can be obtained, even if the quantity of vaporized cooling medium is one-sixteenth or less. If and when the vaporized cooling medium increases and becomes too much to flow in the second auxiliary return pipe alone, that is to say, if the pressure loss becomes large, then a portion of the vaporized cooling medium flows into the first auxiliary return pipe. When the load current is even larger, the vaporized cooling medium will exist in a larger quantity, and will flow also into the main return pipe.

Figure 12:
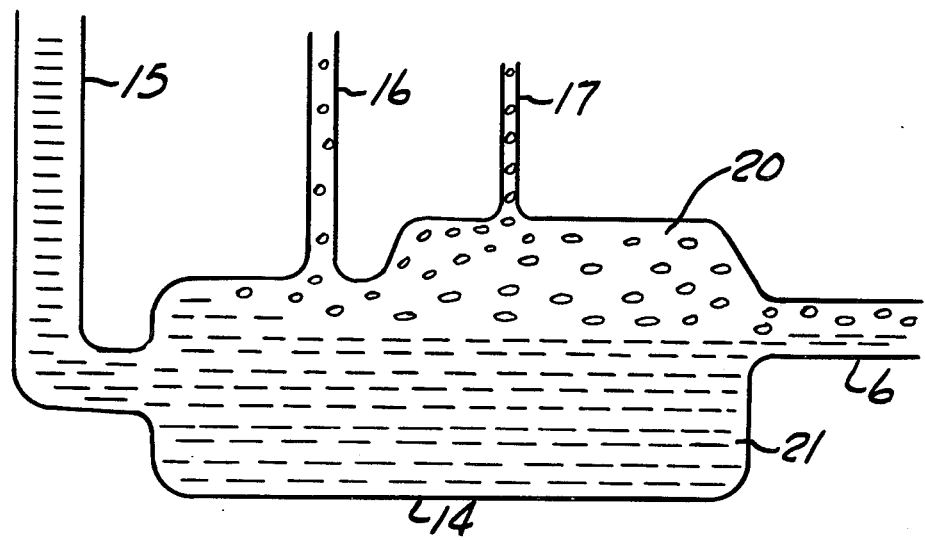
FIG. 12 is an enlarged diagrammatic view of the gas-liquid separator illustrated in FIG. 11.

As the gas-liquid separator sends vaporized cooling medium preferentially into the smaller of the return pipes as mentioned above, it is constructed in the shape of a small-sized stepped tank as shown in FIG. 12. FIG. 12 is a sectional view of the gas-liquid separator. It shows a condition in which vaporized cooling medium 20 is flowing into the second auxiliary return pipe 17 and the first auxiliary return pipe 16. In this example embodiment, the return pipe 6 is also installed downward from or below the cooling medium outlet B.

The gas-liquid separator should be positioned at the lowest point of the riser portion of the return pipe rising to the cooling unit. The effect of boosting circulation force will be made more secure by giving sufficient thermal insulation to the auxiliary pipes and prevent the vaporized cooling medium from being cooled and liquefied in those portions.

Figure 13:
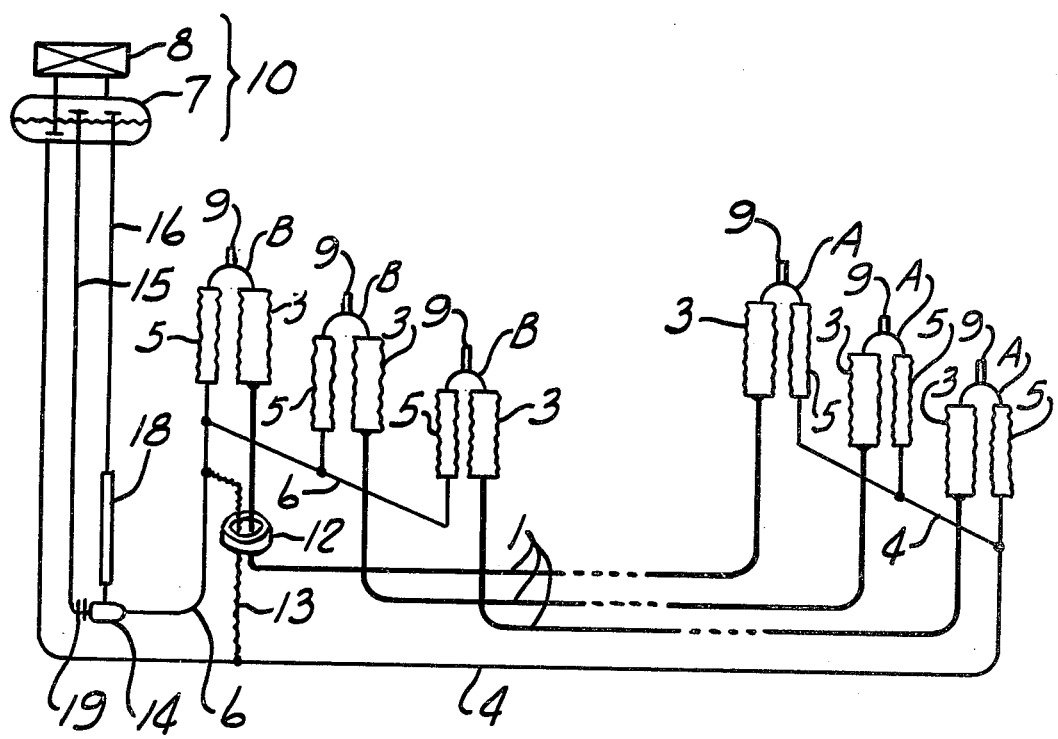
FIG. 13 is a schematic diagram illustrating yet another embodiment of the cable cooling system of the present invention.

FIG. 13 shows an effective combination of the example embodiments shown in FIGS. 10 and 11. In FIG. 13, the return pipe 6 is divided via the gas-liquid separator 14 into the main return pipe 15 and the auxiliary return pipe 16. The lower portion of the auxiliary return pipe 16 is made the heating pipe 18. The main return pipe has the insulating flange joint 19 interposed, so that the electric current caused by the voltage induced by the magnetic core 12 may flow through the conductor 13, return pipe 6 and the heating pipe 18 of the auxiliary return pipe. In this instance, the electric power required for heating can be reduced to one-quarter or less, as compared with the example embodiment shown in FIG. 10. It is therefore possible to make the size of the magnetic core smaller, and it also has the effect of reducing loss of electric power.

In this example, the gas-liquid separator 14, auxiliary return pipe 16, heating pipe 18, magnetic core 12, conductor 13, insulating flange joint 19, etc., are the basic structural elements of the circulation force boosting mechanism.

As has been described in detail with reference to example embodiments, the present invention has the novel effect of removing the restrictive conditions in installing natural circulation type evaporative cooling cables and expanding their scope of application by insuring the force for cooling medium circulation at the load current allowable without cooling or a load current somewhat higher than that by installing the return pipe below the cooling medium outlet and providing a circulation force boosting mechanism in the riser portion of said return pipe rising to the cooling unit.

The cooling medium is generally a liquescent gaseous hydrocarbon, and can be, for example, any one of the following: $CCl_3F$, $CCl_2F_2$, $CClF_3$, $CBrF_3$, $CHCl_2F$, $CHClF_2$, $CHF_2$, $CCl_2F-CCl_2F$, $CCl_2-CClF_2$, $CClF_2-CClF_2$, $CBrF_2-CBrF_2$, $CClF_2-CF_3$, $CF_3-CF_3$ and $C_4F_8$.

We claim:

1. A circulation system for a cooling medium in a natural circulation type evaporative cooling electric power cable line wherein a cooling medium passage within the electric power cable line has an inlet and an outlet respectively connected with a cooling unit positioned at a level higher than the cooling medium passage inlet of said electric power cable by means of a feeding pipe and a return pipe and having sealed therein a liquefiable gas cooling medium, and which is characterized by at least a riser portion of the return pipe leading to the cooling unit installed below the level of the cooling medium return passage outlet of said electric power cable and said return pipe provided with means for boosting circulation force to make the cooling medium circulate even in a low load current region not exceeding the current allowable without cooling for that cable.

2. A circulation system for a cooling medium in a natural circulation type evaporative cooling electric power cable line as claimed in claim 1 wherein said means for boosting circulation force is characterized in that a lower portion of the riser portion of the return pipe installed below the level of the cooling medium return outlet is a heating pipe means of a high electrical resistance metal pipe and the cable is surrounded with a saturation type magnetic core in the neighborhood of the cooling medium outlet, and means for heating said heating pipe by induction current induced therein by said magnetic core to cause circulation of the cooling medium.

3. A circulation system for a cooling medium in a natural circulation type evaporative cooling electric power cable line as claimed in claim 2 wherein said means for heating said heating pipe is adapted such that the heating current is almost saturated when the load current allowable without cooling for the cable flows in the cable while the heating current does not exceed twice the aforementioned current even when the load current allowable with cooling flows in the cable.

4. A circulation system for a cooling medium in a natural circulation type evaporative cooling electric power cable line as claimed in claim 3 wherein said heating pipe is thermally insulated.

5. A circulation system for a cooling medium in a natural circulation type evaporative cooling electric power cable line as claimed in claim 2 including three of said cable for conduction of three-phase current with three of said magnetic core respectively surrounding said cables and wherein said means for boosting circulation force is characterized by three of said return pipe for each cable respectively and each of them including one of said heating pipe of a high electrical resistance metal respectively, and said means for heating said heating pipes by induction current due to the load current of the cable conductor flow in said return pipes including means electrically short-circuiting the three return pipes together on their cooling unit connection side and means electrically short-circuiting them together on their cooling medium outlet side after having the latter short-circuiting means pass through the three magnetic cores surrounding the cables respectively.

6. A circulation system for a cooling medium in a natural circulation type evaporative cooling electric power cable line as claimed in claim 2 including three of said cable for conduction of three-phase current with a branch pipe connecting the three cooling medium passage outlets of said cables to said return pipe, said return pipe and said feeding pipe constructed of good electrical conducting metal, and wherein said means for boosting cooling medium circulation force includes means electrically short-circuiting the return pipe with the feeding pipe, said short-circuiting means passing through said magnetic core which surrounds one of said cables in the neighborhood of its cooling medium outlet, at least a portion of said heating pipe positioned below the cooling medium outlets of said cables.

7. A circulation system for a cooling medium in a natural circulation type evaporative cooling electric power cable line as claimed in claim 1 wherein said means for boosting circulation force is characterized by a gas-liquid separator which separates the vaporized cooling medium and the cooling medium in liquid phase provided at a lower position of the riser portion of the return pipe rising to the cooling unit, the riser return pipe between said gas-liquid separator and the cooling unit divided into a plurality of riser return pipes having different diameters arranged such that vaporized cooling medium will preferentially flow into a riser return pipe of smaller diameter as the temperature of the cable increases.

8. A circulation system for a cooling medium in a natural circulation type evaporative cooling electric power cable line as claimed in claim 7, said means for boosting circulation force further characterized in that a lower portion of a riser return pipe of smaller diameter is a heating pipe made of a high resistance metal and the cable is surrounded with a saturation type magnetic core in the neighborhood of the cooling medium outlet, and means for heating said heating pipe by induction current induced therein by said magnetic core to cause circulation of the cooling medium.

9. A circulation system for a cooling medium in a natural circulation type evaporative cooling electric power cable line as claimed in claim 8, said means for heating including said return pipe, including said riser return pipe of smaller diameter, and said feeding pipe constructed of good electrical conductor metal and electrically short-circuited together at the cooling unit, and conductor means passing through said magnetic core and electrically short-circuiting said return pipe to said feeding pipe to complete an electric circuit for heating said heating pipe by induction current which flows therein due to a load current of the cable.

* * * * *